United States Patent Office 3,832,243
Patented Aug. 27, 1974

3,832,243
SHAPE MEMORY ELEMENTS

Hendrik Cornelis Donkersloot and Johannes Hendrikus Nicolaas van Vucht, Emmasingel, Eindhoven, Netherlands, assignors to U.S. Philips Corporation, New York, N.Y.

No Drawing. Filed Jan. 14, 1971, Ser. No. 106,554
Claims priority, application Netherlands, Feb. 25, 1970, 7002632
Int. Cl. C22c *9/00*
U.S. Cl. 148—32 5 Claims

ABSTRACT OF THE DISCLOSURE

Intermetallic compounds which, upon cooling below a characteristic temperature $T_f$, are subjected to a so-called martensite crystal transformation to a crystal structure having a closer packing may be used as shape memory elements. Shape memory elements have the property that, after deformation at a temperature below $T_f$, they reassume their original shape by heating above $T_f$.

The invention relates to a new shape memory element consisting of an intermetallic compound.

The intermetallic compound NiTi is known to have a particular physical property which has been given the name of "shape memory." It has been found that a plate of NiTi which has been deformed at room temperature reassumes its original shape when it is heated to a temperature of, for example, 100° C. It had so far been generally assumed that only NiTi had this property of shape restoring or "shape memory."

In addition it is known that the CsCl type crystal structure of NiTi existing at high temperature is "martensitically" transformed into another crystal structure upon cooling below a characteristic temperature $T_f$ ($\sim$60° C.). A "martensite" transformation is to be understood to mean a diffusion-less transformation in which atoms are moved in a cooperative manner over distance smaller than an atom distance, which phenomenon may also be described as shearing of planes of atoms over the said distances. A few other systems in which a similar transformation has been observed are *inter alia* Li, Co, Zr, U, Fe, Cu-Zn, Cu-Al, Cu-Sn, Au-Cd, Li-Mg, $BaTiO_3$ and $NH_4TO_3$. (For these transformations see D. S. Liebermann et al., Journal of Applied Physics, Vol. 26, Nr. 4, 1955, p. 473.)

The invention is based on the recognition of the fact that in addition to NiTi there must be other metallic materials having shape memory. Relating the mechanism of the martensite transformation with the shape memory property leads within the scope of the invention to a rule by means of which it is possible to select from the group of metallic materials showing martensite transformation exactly those which have shape memory. In this connection it is to be noted that although it has already been suggested that with respect to NiTi there would be a relationship between the martensite transformation and the shape memory) J. A. Zijderveld et al., Mémoires Scientifiques Rev. Métallurg., LXIII, Nr. 10, 1966, p. 885), said suggestion only relates to the NiTi-system. It has been found that no relationship exists between the shape memory and the occurrence of the martensite transformation as such. The occurrence of the property of shape memory of the above-mentioned group of materials in which a martensite transformation has been observed was not known up till now, and it has been found from investigations which have been performed in the scope of the present invention that only a few representives of the group have shape memory. This means that other conditions have to be considered in addition to the martensite transformation. It is the object of the present invention to present said conditions.

A new shape memory element according to the invention is characterized in that it consists of an intermetallic compound which, above a temperature $T_f$ characteristic of the compound, has a crystal structure I, which crystal structure is martensitically transformed by cooling below $T_f$ into a crystal structure II having a closer packing.

It is to be noted that the effect can occur only when the crystal structure shows an ordering or at least a beginning of ordering. The term crystal structure in this application is always understood to be such a crystal structure. This requirement is connected with the fact that a displaced atom must be able to "recognize" its old location. The old location may not be identical to other locations in the proximity; in that case the atom does not know "the way back."

The temperature range of the transformation, that is to say the transition range in which both the high temperature structure I and the low-temperature structure II occur, may extend over a range which varies from a few tens to a few hundreds of degrees C. It has been found from investigations that plates of intermetallic compounds which satisfy the definition according to the invention, after deformation at the temperature at which only the low temperature structure II occurs regain their original shape by heating above the temperature $T_f$. This means that the shape memory is associated with the transformation in the direction of the low-temperature structure to the high-temperature structure, and that it occurs only in the temperature range of the transformation.

It is an imperative requirement that upon cooling the high-temperature structure is transformed into a structure having a closer packing. From investigations in the scope of the invention it has been found that a transformation from a crystal structure having octahedral atomic arrangement to a crystal structure having dodecahedral atomic arrangement is to be considered in particular, although in some cases also a transition from a structure having another (not octahedral) arrangement to a structure having a closer packed (dodecahedral) arrangement can be connected with the shape memory.

A preferred embodiment of a memory element according to the invention is therefore characterized in that it consists of an intermetallic compound the crystal lattice of which, upon cooling, is converted into a lattice having dodecahedral atomic arrangement by a martensite transformation.

This rule has been compared with a large number of intermetallic compounds all of which turned out to have a shape memory. The invention also relates to shape memory elements which consist of the said intermetallic compounds.

The invention furthermore relates to the application of the new shape memory elements.

A shape memory element according to the invention may be used, for example, as a sensor in thermal safety apparatus. A deformed element (for example, a bent strip) will reassume its original shape (stretch itself) when a particular temperature is exceeded so that, for example, a relay can be actuated. As will be explained below, the invention permits of adjusting any desirable temperature limit by the choice of the material of the shape memory element.

A shape memory element may alternatively be used as a filament which is to be arranged in spaces which are hardly accessible (for example, the envelope of an incandescent lamp). Such a filament can be arranged in the space in question in a folded condition and, by heating it to a given temperature, it will unfold there in a non-recurrent manner.

In order that the invention may be readily carried into effect, it will now be described in greater detail with reference to Table I, in which the composition is given of metallic systems which have been discovered to have a shape memory, as well as the temperatures in degrees Celsius at which plates of the relative materials were deformed (a), and reassumed their original shape (b), respectively.

TABLE I

| Composition | Temperature *a* (° C.) | Temperature *b* (° C.) |
|---|---|---|
| $Au_{42.5}Ti_{57.5}$ | 180 | 500 |
| $Pd_{50}Ti_{50}$ | 400 | 550 |
| $Pd_3Ti_4Fe$ | 20 | 300 |
| $PdTi_2Cu$ | 20 | 400 |
| $Pd_3Ti_4Co$ | 20 | 400 |
| $PtTi_2Co$ | 20 | 300 |
| $FeAu_3Ti_4$ | −200 | 20 |
| $CoAu_2Ti_3$ | 20 | 400 |
| $CuAu_3Ti_4$ | 20 | 400 |
| $MnAu_4Ti_5$ | 20 | 400 |
| $Au_{10}Ti_7Mn_3$ | 20 | 300 |
| $Cu_5CoTi_6$ | −200 | 20 |
| $NiTi_2Cu$ | 20 | 150 |
| $Ni_4Ti_5Co$ | −50 | 20 |
| $NiTi_2Pd$ | 20 | 300 |
| $Ni_3Ti_4Au$ | −200 | 20 |
| $NiTi_2Pt$ | 20 | 200 |
| $Ni_5Ti_4V$ | −200 | 20 |
| $Ni_5Ti_4Zr$ | −200 | 20 |
| AuMn | 20 | 400 |
| Cu+12.5 wt. percent Al | 20 | 400 |
| Cu+25 wt. percent Sn | −200 | 20 |
| Cu+40 wt. percent Zn | −200 | 20 |
| Cu+85 wt. percent Mn | 20 | 400 |

It is to be noted that a complete restoring of shape takes place only in those systems in which during the transformation a competition occurs between two non-deformable structures or between a non-deformable structure and a deformable structure. Systems in which during the transformation a competition takes place between two deformable structures show an incomplete restoring of shape.

In the temperature interval of the martensite transformation, those ones of the alloys mentioned in the table which are otherwise hard and brittle, become flexible which may be considered as the occurrence of a form of ductility. The greatest flexibility is achieved when the material has fully assumed the low-temperature structure. Materials from the above-mentioned series which normally are hard to machine should consequently be machined preferably in the range of the low temperature structure. This also applies, for example, to $Ni_{51}Ti_{49}$ which is already known to have a shape memory and the ductility of which is also known to increase below room temperature. The transition to the low-temperature structure in the case of $Ni_{51}Ti_{49}$ takes place at −120° C. and therefore said alloy should preferably be machined at a temperature below −120° C.

In this connection it is to be noted that the CsCl type structure of $Ni_{51}Ti_{49}$ at −120° C. is converted into a structure X″—which is not yet quite known—while the CsCl type structure of $Ti_{51}Ni_{49}$ at +60° C. is first converted into a structure X′ which in turn is converted again into the structure X″ at −120° C.

So the invention permits of indicating by means of table I the temperatures below which the relative materials should preferably be machined.

It has furthermore been found from investigations within the scope of the invention that it is possible to shift the temperature interval of the transformation at will to lower or higher temperatures by influencing the thermodynamic stability of one of the co-existing phases relative to the other. This means that some hard and brittle alloys can be made ductile at room temperature by varying the composition (that is to say the proportion of the components), or by replacing the components partly by another element in which in addition the total number of substituted atoms has some influence.

Table II shows how the limits of the temperature interval shift when the composition of the binary alloys is varied, and table III shows how the limits shift when a component is replaced by a third element. For this purpose, the tables should be compared with table I.

TABLE II

| Composition | X | Lowest lower limit of the temp. interval (° C.) | Highest upper limit of the temp. interval (° C.) |
|---|---|---|---|
| $Au_{1-x}Ti_x$ | 0.525–0.600 | −200 | +500 |
| $Pd_{1-x}Ti_x$ | 0.55–0.45 | 400 | +550 |
| $Au_{1-x}Mn_x$ | 0.50–0.67 | −200 | +400 |
| $Cu_{1-x}Al_x$ | 0.20–0.28 | +20 | +500 |
| $Cu_{1-x}Sn_x$ | 0.14–0.15 | −200 | +20 |
| $Cu_{1-x}Mn_x$ | 0.80–0.87 | +20 | +200 |
| $Cu_{1-x}Zn_x$ | 0.385–0.395 | −200 | +20 |

TABLE III

| Composition | X | Lowest lower limit of the temp. interval (° C.) | Highest upper limit of the temp. interval (° C.) |
|---|---|---|---|
| $Pd_{1-x}TiFe_x$ | 0–0.25 | −50 | +500 |
| $Pd_{1-x}TiCu_x$ | 0–0.50 | −50 | +500 |
| $Pd_{1-x}TiCo_x$ | 0–0.50 | −200 | +500 |
| $Pt_{1-x}TiCo_x$ | 0.40–0.75 | −50 | +500 |
| $Au_{1-x}TiFe_x$ | 0–0.25 | −200 | +500 |
| $Au_{1-x}TiCo_x$ | 0–0.33 | −50 | +500 |
| $Au_{1-x}TiCu_x$ | 0–0.66 | −200 | +500 |
| $Au_{1-x}TiMn_x$ | 0–0.25 | −100 | +500 |
| $Ti_{1-x}AuMn_x$ | 0–0.5 | −200 | +500 |
| $Cu_{1-x}TiCo_x$ | 0.12–0.20 | −200 | +20 |
| $Ni_{1-x}TiCu_x$ | 0–0.75 | −200 | +100 |
| $Ni_{1-x}TiPd_x$ | 0–1 | −200 | +500 |
| $Ni_{1-x}TiAu_x$ | 0–1 | −200 | +500 |
| $Ni_{1-x}TiPt_x$ | 0–0.05 | −200 | +500 |
| $NiTi_{1-x}V_x$ | 0–0.2 | −200 | +20 |
| $NiTi_{1-x}V$ | $0^3$–0.2 | −200 | +20 |

These tables show on a horizontal line always the range within which the composition was varied and the lowest lower limit and the highest upper limit, respectively, of the transformaton interval which was found in the compositions of the relative range. This means that the maximum shift of the transformation interval which occurs with the indicated variation of the composition is indicated.

It may also be derived from tables II and III how the choice of a system and the choice of the composition of a given system, respectively, determines the upper limit of the transformation interval ($=T_f$). With the help of this the desirable temperature limit can be adjusted in thermal safety apparatus in which a memory element according to the invention is used as a sensor.

It is to be noted that the testing within the scope of the invention of such a large number of samples having different compositions was made possible by using the so-called "splat-cool" method during manufacturing the samples. This method involves the very rapid cooling of a drop of an alloy formed by means of arc melting, by shooting with a jet of gas of pure argon against a cooled copper wall. The resulting very thin plates (thickness from 50 to 100/$\mu$) were tested for shape memory by bending them around a rod having a radius of curvature of 5 mm., and by observing during a thermal process at what temperature a bent plate stretched itself again.

The crystal structures were determined at various temperatures by means of an X-ray diffractometer. Most of the above-mentioned systems have a BCC-crystal structure at high temperatures and an orthorhombic crystal structure at low temperatures. A few of them, however (for example, Au-Mn) have a tetragonal crystal structure at low temperatures.

What is claimed is:

1. A thermally actuated device comprising at least one element consisting of an intermetallic compound containing at least 60 weight percent of copper which has been plastically deformed at a first temperature and which has the capability of retaining the deformed shape until heated to a predetermined transition temperature at which it reverts back to its original shape, said intermetallic compound having a crystal structure which below the said transition temperature has an atomic packing density which is higher than the atomic packing density above the said transition temperature.

2. A thermally actuated device as claimed in Claim 1 in which the crystal structure of said intermetallic compound, below said transition temperature, has a dodecahedral atom arrangement.

3. A thermally actuated device as claimed in Claim 1 in which the intermetallic compound is $Cu_{1-x}Al_x$, $x$ being between 0.20 and 0.28.

4. A thermally actuated device as claimed in Claim 1 in which the intermetallic compound is $Cu_{1-x}Sn_x$, $x$ being between 0.14 and 0.15.

5. A thermally actuated device as claimed in Claim 1 in which the intermetallic compound is $Cu_{1-x}Zn_x$, $x$ being between 0.385 and 0.395.

References Cited

UNITED STATES PATENTS

| | | | |
|---|---|---|---|
| 3,351,463 | 11/1967 | Rozner et al. | 75—170 |
| 3,174,851 | 3/1965 | Buhler et al. | 75—170 |
| 3,529,958 | 9/1970 | Buhler | 75—135 |
| 3,558,369 | 1/1971 | Wang et al. | 75—175.5 X |
| 3,594,239 | 7/1971 | Wang | 148—13 |
| 3,508,914 | 4/1970 | Buhler | 75—135 |
| 3,652,969 | 3/1972 | Willson et al. | 148—11.5 R |
| 3,450,372 | 6/1969 | De Lange et al. | 75—170 |
| 3,622,400 | 11/1971 | Lauriente et al. | 148—13 |

RICHARD O. DEAN, Primary Examiner

U.S. Cl. X.R.

75—154, 157.5, 162

Notice of Adverse Decision in Interference

In Interference No. 100,281, involving Patent No. 3,832,243, H. C. Donkersloot, and J. H. N. van Vucht, SHAPE MEMORY ELEMENTS, final judgment adverse to the patentees was rendered Aug. 13, 1981, as to claims 1-3 and 5.

[*Official Gazette November 3, 1981.*]